No. 636,768. Patented Nov. 14, 1899.
J. G. DELANEY.
CONVEYING APPARATUS.
(Application filed Feb. 5, 1896.)
(No Model.)
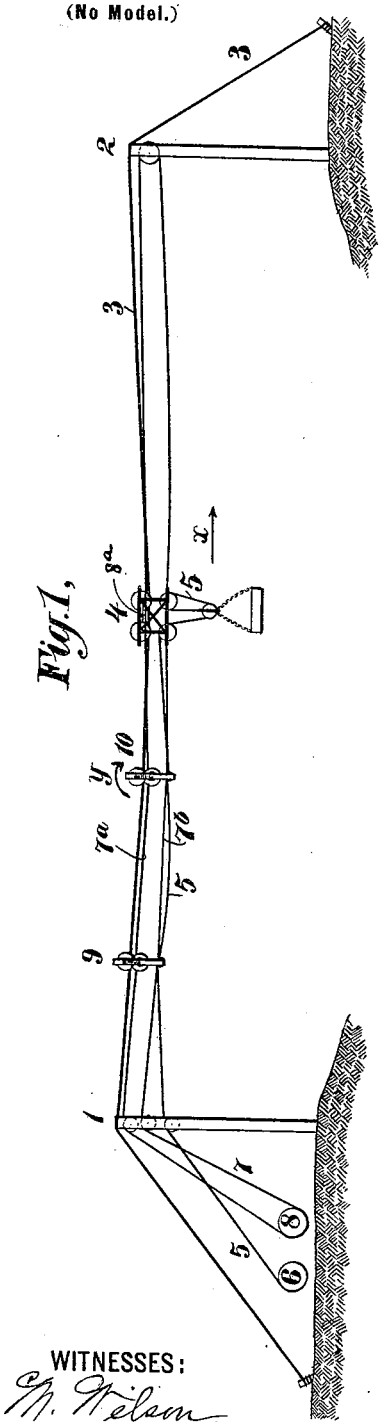
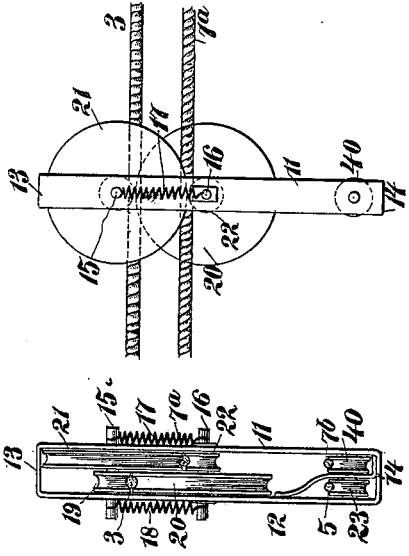
WITNESSES:
INVENTOR
James G. Delaney
BY
ATTORNEYS.

UNITED STATES PATENT OFFICE.

JAMES G. DELANEY, OF NEW YORK, N. Y.

CONVEYING APPARATUS.

SPECIFICATION forming part of Letters Patent No. 636,768, dated November 14, 1899.

Application filed February 5, 1896. Serial No. 578,081. (No model.)

*To all whom it may concern:*

Be it known that I, JAMES G. DELANEY, a citizen of the United States, and a resident of New York, in the county of New York and State of New York, have invented certain new and useful Improvements in Conveying Apparatus, of which the following is a specification.

My present invention relates to that class of apparatus shown in patent to the Lidgerwood Manufacturing Company, dated August 2, 1892, and numbered 480,029, in which the fall-rope carriers contain mechanism for their own propulsion; and my present invention consists in an improvement in the direction of certainty of action, freedom from wear, lightness, and simplicity of construction.

In the accompanying drawings, Figure 1 is a side view of an apparatus. Fig. 2 is an end view of a rope carrier. Fig. 3 is a side view of the same. Figs. 4 and 5 are an end and side view of a modification.

1 is the head-support.
2 is the tail-support.
3 is a trackway, of rope or cable.
4 is the load-carriage.
5 is the fall-rope, driven by drum 6.
7 is the traction-rope, driven by drum 8 and connected at each end with the load-carriage. For convenience I shall designate the upper stretch of the traction-rope as $7^a$ and the lower stretch as $7^b$.

At $8^a$ is a guide on the load-carriage whereby the stretch $7^a$ of the traction-rope is held down by the side of the main cable. The construction of this guide is immaterial; but it may be of the form shown in United States Patent No. 551,869, dated December 24, 1895, to T. S. Miller.

9 and 10 are fall-rope carriers, of which there may be any required number, all similar to that shown in Figs. 2 and 3, but differing among themselves in the relative size of their wheels or sheaves to secure the proper differential of speed. Turning now to Figs. 2 and 3, I will describe one fall-rope carrier as a representative of all. The frame consists of the side pieces 11 and 12 and the top and bottom cross-pieces 13 and 14. 15 and 16 are axles or shafts running parallel and one vertically above the other across between the side pieces of the frame. The shaft 15 has fixed bearings in the frame, and the shaft 16 has a vertically-slotted bearing in the frame, so that it may move bodily to and from the shaft 15, toward which it is yieldingly held by the spiral springs 17 and 18. A wheel 19 on the shaft 15 runs on the main cable 3. A wheel 20 on the shaft 16 serves as a presser to press the main cable and the wheel 19 into close contact and prevent slip between them. A wheel 21, concentric with the wheel 19, runs on the upper stretch $7^a$ of the traction-rope. A wheel 22 on the shaft 16 serves as a presser to press the rope $7^a$ and the wheel 21 into close contact and prevent slip between them. The wheels 21 and 19 are fixed to each other, so that they turn as one. Wheels 20 and 22 are separate, so that they turn as separate wheels. This, however, might be reversed, the wheels 20 and 22 being fixed together and the wheels 19 and 21 separated from each other and the cable 3 and traction-rope $7^a$ changing places. 23 is the wheel-rest for the hoisting-rope, and 40 the wheel-rest for the lower stretch $7^b$ of the traction-rope.

The operation is as follows: It is requisite that all rope carriers should travel in the same direction as the load-carriage, but at a slower rate of speed, and that the rope carriers should differ among themselves as to speed of travel in proportion as they are farther removed in the series from the load-carriage. The upper stretch $7^a$ of the traction-rope travels at the same speed as the load-carriage, but in an opposite direction. When, therefore, the load-carriage is advancing in the direction of arrow $x$ toward the tail-support, the wheel 21 of each rope carrier will be driven in the direction of the arrow $y$. The wheel 19 being compelled to turn in the same direction, it acts as a traction-wheel on the main cable and compels the rope carrier to follow the load-carriage. The reverse motion takes place when the load-carriage is returning toward the head-tower. By constructing the wheel 19 of smaller diameter than the wheel 21 the speed of the carrier may be reduced below that of the load-carriage to any extent desired, and by varying the difference between these wheels, as between different rope carriers, each one of the series may be speeded properly with respect to the others, so that they will automatically divide up between themselves the length of fall-rope they are required to support.

The modification shown in Figs. 4 and 5 is to adapt the construction already described to being propelled by the lower stretch $7^b$ of the traction-rope. The shaft 15 and the concentrically-connected wheels 19, 21 are moved lower down in the frame, and the wheels 20 and 22 are separated. Wheel 20 is placed vertically above wheel 19 on a shaft $16^a$, which has a vertically-slotted bearing in the frame. Wheel 22 is placed vertically below wheel 21 on a shaft $16^b$, which has a vertically-slotted bearing in the frame. The springs 25 and 26 produce the requisite grip between the opposed wheels. The main cable is gripped between wheels 19 and 20. The traction-rope $7^b$ is gripped between wheels 21 and 22.

I claim—

1. In a conveying apparatus, in combination with a stationary rope, a load-carriage and a rope traveling in a direction opposed to the load-carriage, a rope carrier containing two concentrically-connected wheels one of which engages with each of said ropes, substantially as described.

2. In a conveying apparatus, in combination with a stationary rope, a load-carriage and a traction-rope fast to said carriage, a rope carrier containing two concentrically-connected wheels one of which engages with each of said ropes, substantially as described.

3. In combination with the frame of a conveying-apparatus rope carrier, the shafts 15 and 16, the pair of coöperating wheels 19 and 20 mounted on said shafts and the pair of coöperating wheels 21 and 22 mounted on said shafts and means whereby the surfaces of the opposed wheels of each pair are yieldingly held toward each other; one wheel of each pair being fixed to one wheel of another pair and the other wheels of each pair being detached from each other, substantially as described.

4. In combination with the frame of a conveying-apparatus rope carrier, the side-by-side wheels 19, 21 and the side-by-side wheels 20, 22, two of the same being fast together and two separate and a spring whereby said wheels are held toward each other, substantially as described.

5. In a conveying apparatus, the main cable, the load-carriage, the traction-rope fixed to the load-carriage and guided approximately side by side with the main cable and a rope carrier having two concentrically-connected wheels coöperating, respectively, with said traction-rope and said main cable, substantially as described.

6. In a conveying apparatus, in combination a stationary rope, a load-carriage, a traveling rope and a rope carrier containing two concentrically-connected wheels one of which engages with each of said ropes, substantially as described.

JAMES G. DELANEY.

Witnesses:
M. WILSON,
CHAS. J. RATHJEN.